United States Patent Office 3,153,588
Patented Oct. 20, 1964

3,153,588
METHOD OF MELTING SPONGE IRON
Julius D. Madaras, 10 Rockwall Place, Longview, Tex.
No Drawing. Filed July 21, 1960, Ser. No. 44,270
2 Claims. (Cl. 75—12)

The invention relates to the melting of sponge iron and the production from it of pig iron and steel.

Sponge iron is porous and is a very poor heat conductor and therefore, in most cases, it is difficult to melt when charged loose into the melting furnace. When sponge iron is briquetted it forms a compact mass similar to metal punchings and causes many difficulties of melting on a large scale in an electric or gas fired furnace. Furthermore, the molten slag usually affects the lining of the furnace.

In my present invention, the melting furnace may be gas fired or electric. In either case, the furnace may be provided with a suitable roof or cover or may be operated without a roof. The sponge iron preferably should contain carbon, partly combined and partly in graphitic form. The carbon content in the sponge should be regulated by the desired carbon in the melted iron. In my large scale tests, I have succeeded in regulating the carbon in the sponge from a small fraction of one percent to almost seven percent by weight.

The melting of sponge iron in accordance with my present invention can be carried out in a furnace in which the shell and roof are provided with conventional linings. An oxygen lance of the type now widely used in steel making, is inserted through the roof. I also provide means for feeding sponge iron through holes in the roof preferably by means of funnels which extend through the roof into proximity with the lower end of the oxygen lance.

The melting furnace may also be of longitudinal shape in which case the lance will preferably be inserted at an angle through one end and the gas blows substantially longitudinally toward the other end. The furnace is preferably so operated that a plastic sponge iron layer protects the lining substantially as described in my Patent No. 2,704,248. The operation of the oxygen lance is well known in the art of melting iron.

A suitable amount of fuel, preferably natural gas, may be used with the oxygen or, if there is sufficient carbon in the sponge iron, the oxygen is preferably used without other fuel. When sponge iron is made according to the Madaras Process, the reduction of ore is finished at a high temperature and the sponge iron thus obtained can be used in the present process. It is preferably fed into the furnace hot, at approximately 1500–1600° F. average temperature in which case it carries half of the sensible heat necessary to melt from the cold state. The hot sponge iron is fed preferably around the lance, over or near the tip of the lance so that the flame is submerged when the oxygen is mixed with gas, forming a large, intensely hot pocket where the iron together with the slag is melted. The theoretical flame temperature in this pocket will be approximately 5,000° F. when natural gas is used.

Such intense heat melts the sponge iron wherever it is exposed to this heat. The combusted hot gas escapes through the unmelted porous layer of sponge and transfers a substantial part of its heat to the sponge so that the sponge iron melts efficiently.

In case the sponge iron carries enough carbon and the aim is to make steel, there is no need to mix combustible gas with the oxygen because the carbon in the sponge iron will burn with the oxygen, heating and melting the sponge iron. The gas has the tendency to burn holes in the covering layer of sponge iron since it always seeks the least resistance to escape. Care should be taken always to distribute the sponge iron covering layer so that the whole and the apparent thin layers are covered and the escaping gas will give up to the sponge iron most of its heat. This will be accomplished best when the intensely hot combustion pocket is always submerged.

The molten metal and molten slag flow out through suitably placed tap holes or through the same tap hole. This can be done continuously or intermittently. The flow of slag is helped substantially if some of the hot burned product is allowed to be blown through the slag hole.

The invention requires the theoretical heat of approximately 500,000 B.t.u. per ton of iron. Since oxygen burns at an exceedingly high temperature, the heat potential is high and, therefore, it is practical to melt with very high heat efficiency. At about 70% heat efficiency only approximately 700,000 B.t.u. is required and 700 cu. ft. natural gas and 1400 cu. ft. oxygen are required to melt a ton of iron. If the sponge iron carries carbon, about 55 lbs. of carbon will provide this fuel requirement and this means only about 2.5% carbon in the sponge iron.

The highly carburized iron melts at a considerably lower temperature than low carbon iron. When desired, the oxygen flame is so directed that it hits the molten iron of high carbon content and oxidizes the carbon. The heat thus created will melt more sponge iron when it drops or is pressed into the molten iron.

In producing sponge iron according to the Madaras Process, lime stone is usually mixed in with the ore and is calcined during heating and reducing the ore. The hot lime forms slag and the heat of slag formation is usually sufficient to raise the slag to a very high temperature.

The amount of carbon and the oxygen burned and the natural gas used, if any, can be so adjusted that the melted iron will have a desired amount of carburization. If desired, coke breeze may be mixed in with the sponge iron, and also powdered lime may be blown in. Iron and steel scrap may also be added to the sponge iron in any desired quantity and ratio and melted with it.

It is practical to build the melting furnace in an elongated way and have two or three oxygen lances in a line whenever the size of the furnace and the amount of sponge iron to be melted warrants it. Any practical shape of furnace and number of lances may be used and the lances placed in any desired order. It is customary to water cool the lances. In some instances heated air may be used in place of oxygen and, when warranted by conditions, the air may be enriched by oxygen.

The method of melting sponge iron as herein set forth may be referred to as the submerged flame melting method.

It is practical to use electrodes in place of lances and electric power in place of oxygen and fuel as a source of heat. These electrodes may be placed and inserted through the roof of the furnace in the conventional manner or a number of electrodes placed in a row. The sponge iron is preferably fed through the roof or it may be pushed into the furnace through holes on the side or on the end. The essential part of the operation is that the arc should be covered by sponge iron and, therefore, the arc submerged in the sponge iron. This not only protects the roof but also substantially increases the heat efficiency.

Since the Madaras Method of making sponge iron reduces the iron ore practically completely, melting the sponge iron by electric arc produces a negligible amount of gas. It is practical, therefore, to dispense with the roof, if so desired, and feed the sponge iron on the top as needed. The carbon content of the sponge iron protects the sponge iron from oxidizing. Lime may also be spread over the surface of the sponge iron for additional protection.

When an elongated furnace is used, one end of the furnace or most of it can be left uncovered and a roof provided on the other end through which an electrode or electrodes go through the roof. The iron is melted at the uncovered part and the molten iron and slag flow toward the covered part and become further heated by the electric current through the electrodes over the molten material.

Depending upon the nature of sponge iron, as well as upon the relative cost of power and oxygen, the sponge iron may be melted by oxygen at one end of the furnace and treated at the other end by electric power further to raise the temperature or, vice versa, melted by electric power on one end and treated with oxygen lance with or without fuel injection on the other end by burning the oxygen with the carbon in the molten metal, thereby lowering the carbon and raising the temperature of iron and slag. In this case, powdered lime or other flux may also be blown in further to dephosphorize the iron and make the slag more fluid.

What I claim as my invention is:

1. Method of melting sponge iron which comprises forming a cover of the sponge iron to be melted with an underlying pocket, producing an electric arc in said pocket to melt the adjacent sponge iron on the underside of said cover introducing oxygen adjacent said arc, and feeding additional solid sponge iron to maintain the sponge iron cover above the arc while the sponge iron adjacent the arc is being melted.

2. Method of melting sponge iron which comprises forming a cover of sponge iron, producing an electric arc below the sponge iron cover to melt the sponge iron on the underside of said cover introducing oxygen adjacent said electric arc, and continuously feeding additional sponge iron to maintain a solid sponge cover above said arc.

References Cited in the file of this patent

UNITED STATES PATENTS

| | | |
|---|---|---|
| 1,028,151 | Tone | June 4, 1912 |
| 1,242,442 | Humbert | Oct. 9, 1917 |
| 1,391,507 | Riveroll | Sept. 20, 1921 |
| 2,002,010 | Hilliard | May 21, 1935 |
| 2,671,724 | Kompart | Mar. 9, 1954 |
| 2,800,631 | Suess | July 23, 1957 |

FOREIGN PATENTS

| | | |
|---|---|---|
| 873,301 | France | July 6, 1942 |